(12) United States Patent
Byma et al.

(10) Patent No.: US 6,322,658 B1
(45) Date of Patent: *Nov. 27, 2001

(54) METHOD FOR MAKING A COMPOSITE HEADLINER

(75) Inventors: George B. Byma, Clarkston; John J. Gabrysiak, Lake Orion, both of MI (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 85 days.

(21) Appl. No.: 09/027,702

(22) Filed: Feb. 23, 1998

(51) Int. Cl.$^7$ .......................... B32B 31/04; B32B 31/12; B32B 31/14; B32B 31/16; B32B 31/20

(52) U.S. Cl. .................. 156/309.9; 156/62.8; 156/272.2; 156/297; 156/299; 156/300; 156/306.6; 156/307.7; 156/308.2; 156/320; 156/322; 156/327; 156/332; 296/39.1; 296/214; 428/458; 428/457; 428/480; 428/481; 442/120; 442/232; 442/268; 442/286; 442/378; 442/381; 442/394

(58) Field of Search ............................. 428/3, 457, 480, 428/458, 481; 442/120, 268, 232, 286, 392, 378, 394, 381, 395; 156/306.6, 308.2, 307.7, 309.9, 320, 322, 327, 332, 62.8, 272.2, 297, 299, 300; 296/39.1, 210, 211, 214

(56) References Cited

U.S. PATENT DOCUMENTS

| | | |
|---|---|---|
| 4,020,207 | 4/1977 | Alfter et al. . |
| 4,131,702 | 12/1978 | Alfter et al. . |
| 4,211,590 | 7/1980 | Steward et al. . |
| 4,327,049 | 4/1982 | Miller . |
| 4,828,910 | 5/1989 | Haussling . |
| 4,840,832 | 6/1989 | Weinle et al. . |
| 4,957,797 | 9/1990 | Maeda et al. . |
| 5,057,175 | 10/1991 | Ashton . |
| 5,292,577 | 3/1994 | Van Korrebrouck et al. . |
| 5,486,256 | 1/1996 | Romesberg et al. . |
| 5,503,903 | 4/1996 | Bainbridge et al. . |
| 5,614,145 | 3/1997 | O'Kane . |
| 5,660,908 | 8/1997 | Kelman et al. . |
| 5,679,296 | 10/1997 | Kelman et al. . |
| 5,718,791 | * 2/1998 | Spengler .............................. 156/212 |
| 5,874,136 | * 2/1999 | Michna et al. ......................... 428/31 |
| 5,976,295 | * 11/1999 | Ang ..................................... 156/219 |

FOREIGN PATENT DOCUMENTS

| | | |
|---|---|---|
| 93 02 870 | 5/1993 | (DE) . |
| 0 569 846 A2 | 11/1993 | (EP) . |
| WO 94/17234 | 8/1994 | (WO) . |
| WO 97/32752 | 9/1997 | (WO) . |
| WO 98/55291 | 12/1998 | (WO) . |
| WO 99/02335 | 1/1999 | (WO) . |

OTHER PUBLICATIONS

Railway Engineer International, vol. 5, No. 3, May 1980, Bury St. Edmunds GB, p. 55–56 XP002034798; I F Coleby: "Honeycomb Sandwich Structures".

English translation Corresponding to DE 93 02 870, May 1993.

* cited by examiner

Primary Examiner—Vivian Chen

(57) ABSTRACT

A method for making a unitary composite headliner adapted to be installed in a motor vehicle includes providing an inner layer and two reinforcing layers, each of which comprises polymeric material, the inner layer being configured to absorb sound and vibrations, and the reinforcing layers being configured to provide sufficient flexibility to the headliner to facilitate installation in the vehicle, while also providing sufficient rigidity to the headliner to enable the headliner to be self-supporting once installed in the vehicle; differentially heating the layers such that each reinforcing layer is heated to a respective predetermined reinforcing layer temperature, and the inner layer is heated to a predetermined inner layer temperature less than either respective reinforcing layer temperature; inserting the layers into a mold such that the inner layer is disposed between the reinforcing layers; and compressing the layers together to bond the layers and form the headliner.

18 Claims, 2 Drawing Sheets

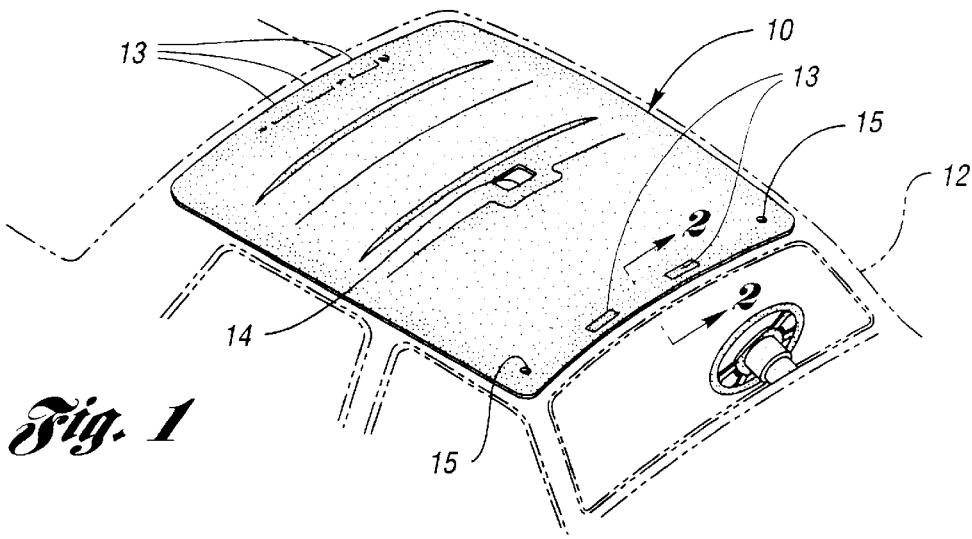

*Fig. 1*

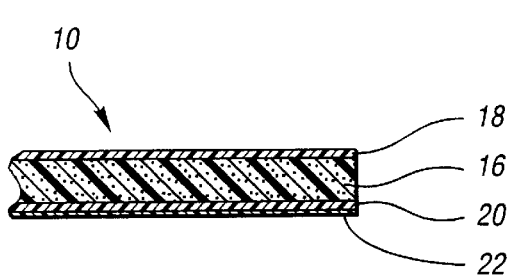

*Fig. 2*

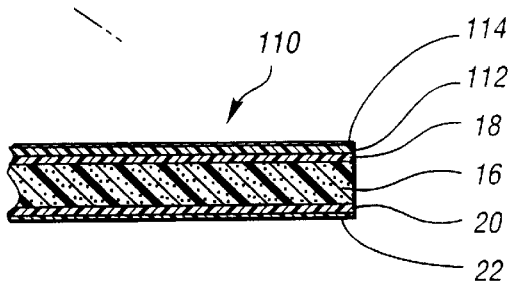

*Fig. 3*

```
PROVIDING AT LEAST TWO LAYERS OF POLYMERIC
MATERIAL, ONE OF THE LAYERS BEING CONFIGURED TO
ABSORB SOUND AND VIBRATIONS, AND ANOTHER OF THE
LAYERS BEING CONFIGURED TO PROVIDE FLEXIBILITY AND
RIGIDITY TO THE HEADLINER;
          ↓
DIFFERENTIALLY HEATING THE LAYERS
TO PREDETERMINED TEMPERATURES;
          ↓
INSERTING THE LAYERS INTO A MOLD; AND
          ↓
COMPRESSING THE LAYERS TOGETHER TO BOND
THE LAYERS AND FORM THE HEADLINER
```

*Fig. 4*

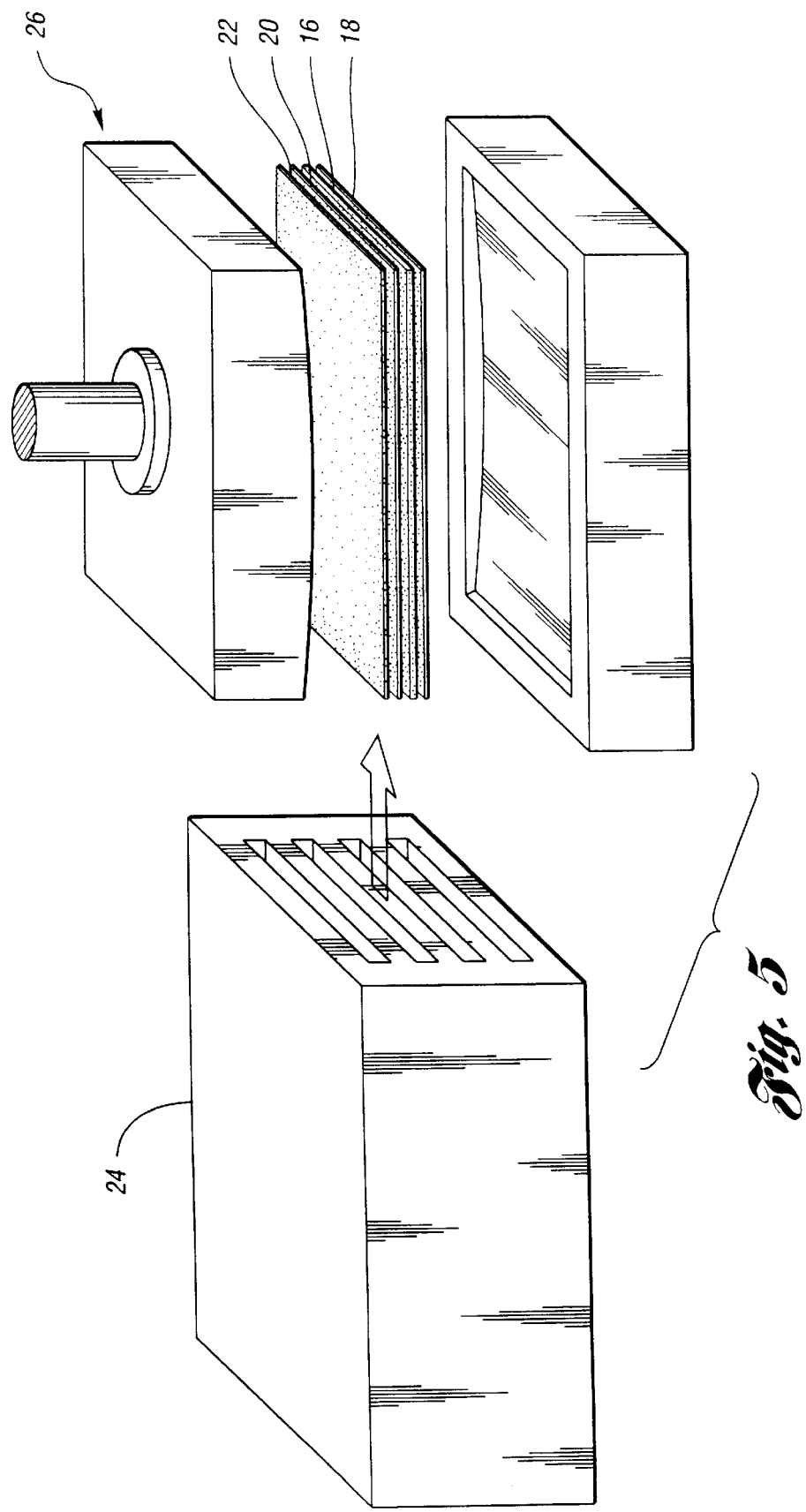

METHOD FOR MAKING A COMPOSITE HEADLINER

TECHNICAL FIELD

The invention relates to headliners for motor vehicles.

BACKGROUND ART

Prior headliners for motor vehicles include a batt of fiberglass impregnated with a thermosetting resin. The headliner is typically compression molded in a heated mold, and then cooled to attain the desired shape. Such headliners are self supporting, but are also relatively inflexible and brittle. As a result, they are easily broken or damaged during shipment and installation.

Other headliners have been proposed which are more flexible and resilient than fiberglass headliners. U.S. Pat. No. 4,840,832, for example, shows a headliner which is formed from a layer of polymeric fibers combined with a foam layer and a fabric surface layer. The layers are preheated together in an oven and then molded into a predetermined shape. Because the layers are simultaneously heated to approximately the same temperature, however, optimal compression of the different layers is difficult to achieve.

U.S. Pat. No. 4,828,910 shows a thermoformed laminate which is useful in headliners, and the laminate includes a layer of resilient sound absorbing material sandwiched between two layers of reinforcing materials. The method of making such laminates includes introducing the layers into a heated mold and thermoforming the layers together to achieve a desired shape. As with the previous example, however, optimal compression of the different layers is difficult to achieve because the layers are all heated to approximately the same temperature. Furthermore, because the reinforcing materials are different in composition than the sound absorbing material, the laminate is not recyclable as a unit.

SUMMARY OF THE INVENTION

The invention is a unitary composite headliner adapted to be installed adjacent a motor vehicle roof. The headliner comprises at least two layers of polymeric material, one of the layers being configured to absorb sound and vibrations, and the other of the layers being configured to provide sufficient flexibility to the headliner to facilitate installation in the vehicle, while also providing sufficient rigidity to the headliner to enable the headliner to be self-supporting once installed in the vehicle. The layers are bonded together by differentially heating each layer to a predetermined temperature and compressing the layers together.

A method for making the headliner is also disclosed. The method comprises providing at least two layers of polymeric material, one of the layers being configured to absorb sound and vibrations, and the other of the layers being configured to provide flexibility and rigidity to the headliner; differentially heating the layers to predetermined temperatures; inserting the layers into a mold; and compressing the layers together to bond the layers and form the headliner.

Accordingly, it is an object of the invention to provide an improved composite headliner which optimizes sound absorbing properties in combination with flexibility and structural rigidity.

It is another object of the invention to provide an improved composite headliner which is entirely recyclable as a unit.

It is yet another object of the invention to provide a method of making the composite headliner which includes differentially heating multiple layers of recyclable polymeric material and then compression molding the layers together to obtain optimal compression and bonding of the layers.

These and other objects, features and advantages of the invention are readily apparent from the following detailed description of the best modes for carrying out the invention when taken in conjunction with the accompanying drawings.

BRIEF DESCRIPTION OF THE DRAWINGS

FIG. 1 is a perspective view of a composite headliner according to the present invention as in-stalled in a motor vehicle;

FIG. 2 is a cross-sectional view taken along line 2—2 of FIG. 1;

FIG. 3 is a cross-sectional view similar to FIG. 2 and showing a second embodiment of the composite headliner according to the invention;

FIG. 4 is a schematic illustration of steps of a method according to the invention; and FIG. 5 is a diagrammatic view of an apparatus for practicing the method.

BEST MODES FOR CARRYING OUT THE INVENTION

With reference to the drawings, the preferred embodiments of the invention will be described. FIG. 1 shows a composite headliner 10 according to the invention mounted to the underside of a roof of a motor vehicle 12 using hook-and-loop fastener strips 13 and interior trim strips (not shown) mounted along opposite sides of the headliner. The headliner 10 may include an opening 14 for a dome light and openings 15 for receiving the mounting hardware for a pair of sun visors. Depending on the application, the headliner 10 may include various other openings as necessary. Alternatively, it may be desirable to pre-install such components as dome lights, sun visors, coat hooks, wire harnesses and the like on the headliner 10 prior to mounting the headliner in the vehicle 12. As shown in FIG. 2, the headliner 10 comprises a laminate or composite construction including an inner layer 16 sandwiched between two outer or reinforcing layers 18 and 20. A cover member 22 is attached to reinforcing layer 20, and provides an aesthetically pleasing finished surface on the underside of the vehicle roof.

The inner layer 16 comprises a blend of nonwoven fibers, including fine denier fibers, regular denier fibers and binder fibers which contain a relatively low melting temperature component. The fibers range from 0.8 to 15 denier, and the inner layer 16 preferably contains 20–50% of fine fibers in the range of 0.8 to 3 denier, 0–70% of fibers in the range of 4 to 15 denier and 10–50% of binder fibers. The fibers are preferably formed of a recyclable thermoplastic polymer, including polyester, nylon, polyethylene and/or polypropylene, which enables the headliner 10 to be recycled as a unit. Presently preferred are polyester fibers, including bi-component polyester fibers having a relatively low melting temperature binder component and a higher melting temperature strength component. Alternatively, the fibers may be formed of any suitable polymeric material. The thickness of the inner layer 16 ranges from 0.5 to 20 millimeters (mm), and is preferably in the range of 0.5 to 15 mm. The inner layer 16 preferably has a relatively low density with a basis weight in the range of 200 to 800 grams/meter$^2$ (g/m$^2$), and preferably in the range of 400 to 500 g/m². The inner layer 16 with the blend of fibers described above and its relatively low density provides for excellent sound absorption properties while maintaining a relatively low mass. Alternatively, the headliner 10 may have a plurality of inner layers, each of which is configured to absorb sound and vibrations.

Binder materials can be mixed with the fibers to provide the inner layer 16 with additional dimensional stability when exposed to extreme temperatures, humidity, or mechanical strain. Suitable binder materials include co-polymeric binder fibers, thermosetting binder powders, or fully or partially crystallized bicomponent or staple fibers, such as Hoechst J58, Wellman T0196, or Unitika 7080 polyester bi-component fibers.

The reinforcing layers 18 and 20 comprise a blend of nonwoven fibers having a denier in the range of 0.8 to 200 denier, and preferably in the range of 6 to 25 denier. Each of the reinforcing layers 18 and 20 also preferably contains 20–50% binder material. The fibers and the binder material are preferably formed of a recyclable thermoplastic polymer, including polyester, nylon, polyethylene and/or polypropylene, which enables the headliner 10 to be recycled as a unit. Presently preferred are fibers and binder material formed of polyester. Alternatively, the fibers and binder material may be formed of any other suitable polymeric material. Each of the layers 18 and 20 has a thickness in the range of 0.5 to 10 mm, and preferably in the range of 0.5 to 5 mm. The basis weight of each of the reinforcing layers 18 and 20 can range from 100 to 800 g/m², and is preferably in the range of 400 to 600 g/m². The reinforcing layers 18 and 20 are configured to provide the headliner 10 with structural rigidity in combination with flexibility and resiliency. Alternatively, the headliner 10 may have more than two reinforcing layers.

The cover member 22 is preferably made of nonwoven polyester which enables the headliner 10 to be recycled as a unit, but it may be made of any other suitable polymeric material. An adhesive preferably made of polyester may be used to aid in the bonding of the cover member 22 to the reinforcing layer 20. It is also possible to eliminate the cover member 22 if the characteristics of the reinforcing layer 20 are aesthetically satisfactory.

FIG. 3 shows a second embodiment 110 of the headliner including a stiffening layer 112 and a scrim layer 114 overlaying the reinforcing layer 18. The stiffening layer 112 provides additional rigidity to the headliner 110 and may comprise such materials as fiberglass, a metal mesh, metal fibers or natural fibers such as jute, knaff, or hemp. Any of these materials may also be imbedded in a polymeric matrix. Alternatively, one or more stiffening layers 112 may be sandwiched between any of the layers 16, 18 and 20, and/or between the reinforcing layer 20 and the cover member 22. The scrim layer 114 provides a finished surface for mounting against the vehicle roof, and may be eliminated from the headliner 110 depending on the application. Additionally, the scrim layer 114 may be used to provide additional rigidity to the headliner 110 and/or to assist in holding the stiffening layer 112 together. Furthermore, adhesives may be used to bond the stiffening layer or layers 112 and the scrim layer 114, if used, to the headliner 110.

FIG. 4 schematically illustrates steps of a method according to the invention of making the headliner 10. By this method, the inner layer 16 and the reinforcing layers 18 and 20 are preferably differentially heated to predetermined temperatures in an oven 24 configured to individually receive and heat each of the layers, as shown in FIG. 5. The inner layer 16, the reinforcing layer 18 and the reinforcing layer 20 are preferably heated to 185° C., 215° C. and 210° C., respectively. Alternatively, the inner layer 16, the reinforcing layers 18 and 20, and the cover member 22 may be individually heated or simultaneously heated to the same or different temperatures in any manner known to those skilled in the art, or preheating one or more of the layers and/or the cover member may be eliminated.

The inner layer 16, the reinforcing layers 18 and 20, and the cover member 22, if used, are then inserted into a compression mold 26 where they are compressed and simultaneously thermoformed, thereby bonding the layers and the cover member together and forming the headliner 10. During the thermoforming process, fibers within each of the layers 16, 18 and 20, and fibers from adjacent layers are bonded together at a multiplicity of locations. The compression mold 26 can include thermally regulated cold, warm or hot mold halves. The mold halves can also be provided with varying mold surfaces so that portions of the headliner 10 can be compressed to different thicknesses within a range of 3 to 40 mm, and preferably within a range of 3 to 25 mm. For example, it may be desirable to compress certain portions of the headliner 10 to a greater extent to increase structural rigidity, or to create recesses in the headliner that conform to projections on the underside of the vehicle roof. Depending on the application, adhesives can also be used between two or more of the layers 16, 18 and 20, and/or between the reinforcing layer 20 and the cover member 22. Such adhesives are preferably made of polyester so that the headliner 10 can be recycled as a unit, but the adhesives may be made of any other suitable material. Alternatively, the cover member 22 can be molded or otherwise attached to a previously formed substrate including the inner layer 16 and reinforcing layers 18 and 20.

Differentially heating the inner layer 16 and the reinforcing layers 18 and 20 enables the layers to be optimally compressed and bonded together during the thermoforming process. For example, reinforcing layers with different thicknesses, fiber blends, or densities may require different heating times or temperatures to sufficiently melt the relatively low melting temperature component of the binder fibers, or other binder material, and to sufficiently soften the other fibers so as to increase the compressibility of the layers. Furthermore, because the sound absorbing capabilities of the headliner 10 depend largely on the density of the inner layer 16, it may be desirable to minimize heating of the inner layer, as compared with the reinforcing layers 18 and 20, so as to minimize compression of the inner layer by the thermoforming process.

The headliner 10 formed by the above method has improved sound absorbing properties in combination with structural rigidity and flexibility. Because the compression of the inner layer 16 is minimized, the sound absorption properties of the inner layer are maximized. Because the reinforcing layers 18 and 20 are optimally compressed and the fibers of each layer are optimally bonded together, the structural rigidity of the headliner 10 is also optimized. As a result, the headliner 10 does not substantially bow or sag when exposed to heat or humidity, and the headliner easily supports its own weight, as well as the weight of components mounted to the headliner, such as a dome light or coat hooks. The reinforcing layers 18 and 20, however, should also remain highly flexible and resilient so that the headliner 10 can be installed in the vehicle 12 easily and without fracturing or breaking.

Furthermore, the invention provides a headliner that is preferably recyclable as a unit, so there is no need to separate components prior to recycling. In particular, the thermoplastic layers of the headliner can be easily reground or shredded together, and the ground or shredded material can be used to preferably form a new headliner or other thermoplastic parts.

The headliner 110 can be manufactured by the process previously described. The stiffening layer 112 and the scrim layer 114, if used, may be preheated to a predetermined temperature either individually or simultaneously with any one or more of the layers 16, 18 and 20 and/or the cover member 22, if used. Alternatively, preheating of the stiffening layer 112 and the scrim layer 114 may be eliminated. In either case, the stiffening layer 112 and the scrim layer 114 are then inserted into the mold 26 with the other layers 16, 18 and 20 and the cover member 22, where they are thermoformed with the other layers and the cover member to form the headliner 110.

The invention has been described in an illustrative manner, and it is to be understood that the terminology which has been used is intended to be in the nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A method for making a unitary composite headliner adapted to be installed in a motor vehicle, the method comprising:

providing an inner layer and two reinforcing layers, each of which comprises polymeric material, the inner layer being configured to absorb sound and vibrations, and the reinforcing layers being configured to provide sufficient flexibility to the headliner to facilitate installation in the vehicle, while also providing sufficient rigidity to the headliner to enable the headliner to be self-supporting once installed in the vehicle;

differentially heating the layers such that each of the reinforcing layers is heated to a respective predetermined reinforcing layer temperature, and the inner layer is heated to a predetermined inner layer temperature less than either respective reinforcing layer temperature;

inserting the layers into a mold such that the inner layer is disposed between the reinforcing layers; and compressing the layers together to bond the layers and form the headliner.

2. The method of claim 1 further including inserting at least one stiffening layer into the mold with the inner layer and the reinforcing layers.

3. The method of claim 2 wherein the at least one stiffening layer comprises a metal mesh.

4. The method of claim 2 wherein the at least one stiffening layer comprises metal fibers.

5. The method of claim 2 wherein the at least one stiffening layer comprises natural fibers.

6. The method of claim 1 wherein each of the layers comprises a recyclable polymeric material which enables the headliner to be recycled as a unit.

7. The method of claim 1 wherein the layers comprise polyester fibers.

8. The method of claim 7 further including providing a cover member of polyester and inserting the cover member into the mold before inserting the layers into the mold.

9. The method of claim 7 further including providing a cover member of polyester and inserting the cover member into the mold with the layers.

10. The method of claim 9 further including heating the cover member to a predetermined temperature before inserting the cover member into the mold with the layers.

11. The method of claim 9 further including applying a polyester adhesive to the cover member before inserting the cover member into the mold with the layers.

12. The method of claim 9 further including providing an adhesive layer comprising polyester and inserting the adhesive layer into the mold with the layers and the cover member, the adhesive layer being positioned between the cover member and one of the layers.

13. The method of claim 1 wherein the differentially heating step includes heating each of the reinforcing layers to the same predetermined reinforcing layer temperature.

14. The method of claim 1 wherein the differentially heating step includes heating each of the reinforcing layers to a different predetermined reinforcing layer temperature.

15. The method of claim 1 wherein the differentially heating step includes differentially heating the layers in an oven configured to individually receive and heat each of the layers.

16. The method of claim 1 wherein the differentially heating step includes heating the inner layer to about 185° C.

17. The method of claim 16 wherein the differentially heating step includes heating each of the reinforcing layers to at least 210° C.

18. A method for making a unitary composite headliner adapted to be installed in a motor vehicle, the method comprising:

providing at least one inner layer, two reinforcing layers, and a cover member, each of which comprises a recyclable polyester material, the at least one inner layer being configured to absorb sound and vibrations, and the reinforcing layers being configured to provide sufficient flexibility to the headliner to facilitate installation in the vehicle, while also providing sufficient rigidity to the headliner to enable the headliner to be self-supporting once installed in the vehicle;

applying a polyester adhesive to the cover member;

differentially heating the at least one inner layer and reinforcing layers in an oven configured to individually receive and heat each of the layers such that each of the reinforcing layers is heated to a respective predetermined reinforcing layer temperature, and the at least one inner layer is heated to a predetermined inner layer temperature less than either respective reinforcing layer temperature;

inserting the layers and the cover member into a mold with the at least one inner layer being sandwiched between the reinforcing layers, and the cover member being adjacent one of the reinforcing layers; and compressing the layers and the cover member together to bond the layers and the cover member together and to form the headliner, wherein the headliner is recyclable as a unit.

* * * * *